United States Patent

Eizenhöfer et al.

[11] Patent Number: 5,412,078
[45] Date of Patent: May 2, 1995

[54] REACTIVE PYRIDONE-CONTAINING DYESTUFFS, THEIR PREPARATION AND THEIR USE

[75] Inventors: Thomas Eizenhöfer, Cologne; Wolfgang Harms, Odenthal; Karl-Josef Herd, Odenthal-Holz, all of Germany

[73] Assignee: Bayer Aktiengesellschaft, Leverkusen, Germany

[21] Appl. No.: 9,493

[22] Filed: Jan. 26, 1993

[30] Foreign Application Priority Data

Feb. 6, 1992 [DE] Germany .............. 42 03 280.6

[51] Int. Cl.⁶ .................. C09B 62/08; C09B 62/507; D06P 1/38
[52] U.S. Cl. .................. 534/635; 534/582; 534/598
[58] Field of Search ........................ 534/635

[56] References Cited

U.S. PATENT DOCUMENTS

| | | | |
|---|---|---|---|
| 4,730,038 | 3/1988 | Meininger et al. | 534/637 |
| 5,021,558 | 6/1991 | Buch et al. | 534/635 X |

FOREIGN PATENT DOCUMENTS

| | | |
|---|---|---|
| 0065732 | 12/1982 | European Pat. Off. . |
| 0085025 | 8/1983 | European Pat. Off. . |
| 0085654 | 8/1983 | European Pat. Off. . |
| 0273343 | 7/1988 | European Pat. Off. . |
| 0307817 | 3/1989 | European Pat. Off. . |
| 0316778 | 5/1989 | European Pat. Off. . |
| 3829595 | 3/1990 | Germany . |
| 3916661 | 11/1990 | Germany . |

OTHER PUBLICATIONS

Derwent Abstract, JO 3009-958-A, May 22, 1990.
Derwent Abstract, JO 2105-865-A, Aug. 31, 1989.

Primary Examiner—Mary C. Lee
Assistant Examiner—Fiona T. Powers
Attorney, Agent, or Firm—Sprung Horn Kramer & Woods

[57] ABSTRACT

The reactive dyestuffs of the formula

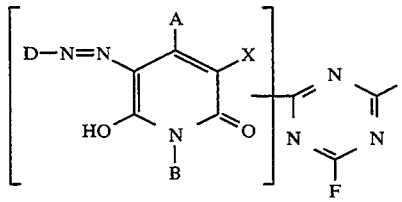

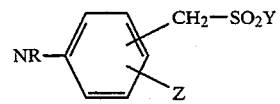

wherein the substituents have the meaning given in the description, are particularly suitable for dyeing naturally occurring and synthetic materials containing OH groups and/or amide groups.

4 Claims, No Drawings

REACTIVE PYRIDONE-CONTAINING DYESTUFFS, THEIR PREPARATION AND THEIR USE

The invention relates to new reactive dyestuffs. Reactive dyestuffs are widely employed for dyeing and printing textile fibre materials. Although combinations of reactive components are known from EP-A 85 025, EP-A 65 732, U.S. Pat. No. 4 730 038 and EP-A 307 817, the prior art achieved still has use technology problems and is therefore in need of improvement. The present invention relates to reactive dyestuffs which, as the free acid, correspond to the formula (I)

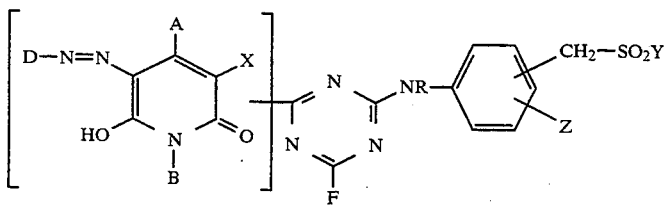

wherein
D = the radical of a diazo component,
A = H, $C_1$-$C_4$-alkyl, $CO_2H$ or $CONH_2$,
B = H, $C_1$-$C_6$-alkyl, a $C_1$-$C_6$-alkyl radical which is substituted by OH, $SO_3H$, $OSO_3H$, $NH_2$, $CO_2H$, $NH(C_1$-$C_4$-alkyl) or $C_1$-$C_4$-alkoxy, a cycloaliphatic $C_3$-$C_6$-hydrocarbon radical, a phenyl radical or a phenyl radical which is substituted by $SO_3H$, $CO_2H$, $CH_3$, $OCH_3$, $OC_2H_5$, $NH_2$ or $NH(C_1$-$C_4$-alkyl),
X = H, Cl, Br, $CH_3$, $CH_2SO_3H$, $CH(CH_3)$—$SO_3H$, $CONH_2$, $COCH_3$, $SO_3H$ or CN,
R = H, $CH_3$, $C_2H_5$, $C_3H_7$, $CH_2CH_2OH$, $CH_2CH_2CO_2H$, $CH_2CO_2H$ or $CH_2CH_2CN$,
Z = H, $CH_3$, $C_2H_5$, $OCH_3$, $OC_2H_5$ or $OC_3H_7$ and
Y = $CH$=$CH_2$, $CH_2CH_2OSO_3H$ or $CH_2CH_2Cl$.

D preferably represents a radical of the benzene, naphthalene or azobenzene series which contains sulpho groups, and can additionally be substituted by further substituents, for example $SO_3H$, $CO_2H$, $C_1$-$C_4$-alkyl, $SO_2W$, $CH_2SO_2W$, halogen, $C_1$-$C_4$-alkoxy, acylamino or ureido, specifically with an acylatable amine function, such as amino, $C_1$-$C_4$-alkylamino, amino-$C_1$-$C_4$-alkyl, for example aminomethyl or (methylamino)methyl, or 2-aminoethylsulphonyl or 2-(N-alkylamino)-ethylsulphonyl, W having one of the meanings given under Y.

The radical

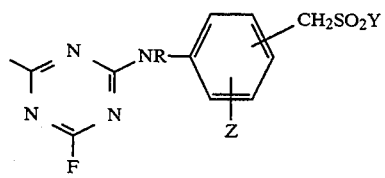

designated "T" below can be bonded either to D or to B. Dyestuffs which are to be singled out are the azopyridone dyestuffs of the formulae (II) and (III)

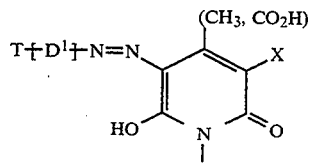

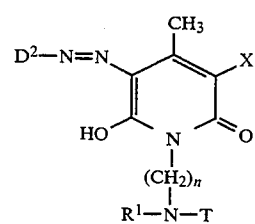

wherein
B = H, $CH_3$, $C_2H_5$, $C_3H_7$, $C_4H_9$, $CH_2CH_2SO_3H$, $CH_2CH_2OSO_3H$ or $CH_2CH_2CH_2OCH_3$,
X = H, $SO_3H$, $CONH_2$ or $CH_2SO_3H$,
n = 2, 3 or 4,
$R^1$ = H, $C_1$-$C_4$-alkyl or $CH_2CH_2OH$ and
$D^1$ = a radical of the formula

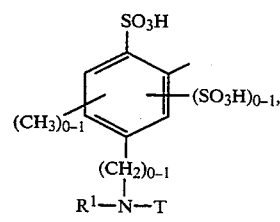

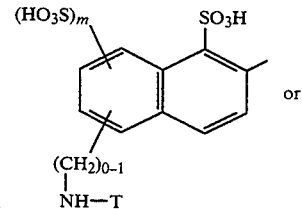

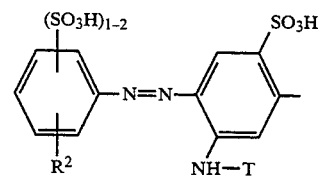

and $D^2$ = a radical of the formula

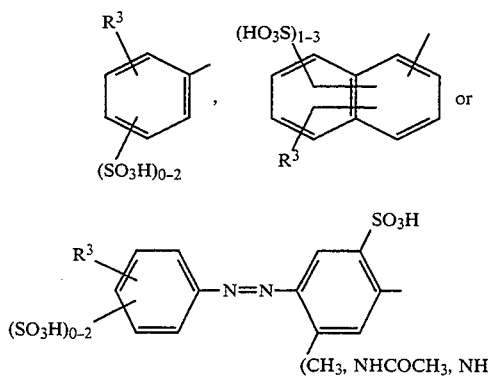

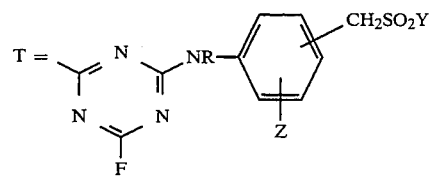

where m=0 or 1 and
R³ and R²=H, CH₃, OCH₃, OC₂H₅, CH₂SO₂W or SO₂W and

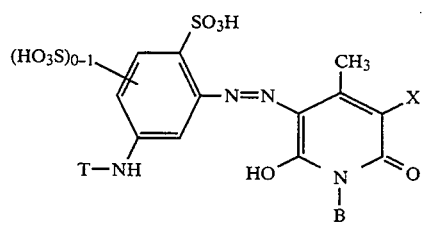

wherein Y, Z and W have the abovementioned meaning.

Particularly preferred dyestuffs are the monoazo reactive dyestuffs of the formula (IV)

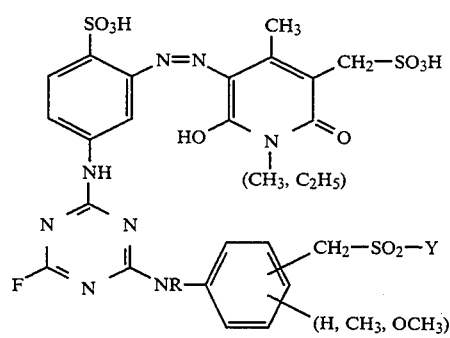

wherein
B=CH₃, C₂H₅ or CH₂CH₂SO₃H,
X=H, CONH₂ or CH₂SO₃H and
T has the abovementioned meaning.

Dyestuffs which are to be singled out in particular are those of the formula (V)

(V)

wherein
R=H or CH₂₅ and
Y=CH=CH₂, CH₂CH₂OSO₃H or CH₂CH₂—Cl.

In a preferred embodiment, the dyestuffs are present in the form of salts, in particular alkali metal salts.

The dyestuffs can be obtained and employed either in the form of powders or in the form of concentrated aqueous solutions.

The azo dyestuffs according to the invention can exist in several tautomeric forms, for example also in the form of hydrazone tautomers. For simplicity, the dyestuffs are shown only in one of these tautomeric forms.

The dyestuffs (I) are prepared by a process in which pyridone dyestuffs of the formula (VI)

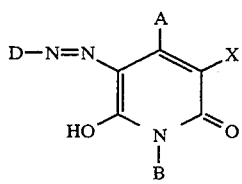

wherein either substituent B or substituent D contains an acylatable amino group, are subjected to a condensation reaction with trifluoro-s-triazine in the presence of acid-binding agents, and the condensation product of the formula (VII)

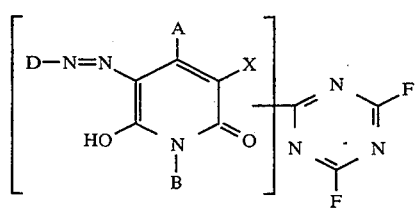

is then reacted with an amino compound of the formula (VIII)

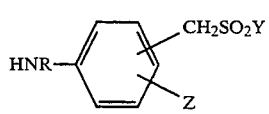

under neutral reaction conditions.

However, the preparation can also be carried out by a process in which trifluoro-s-triazine is subjected to a condensation reaction with an amino compound of the formula (VIII) in the presence of acid-binding agents and the resulting difluorotriazine compound of the formula (IX)

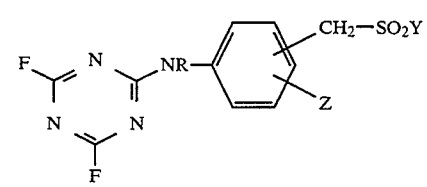

is then reacted with colour bases of the formula (VI).

The monoazo reactive dyestuffs of the formula (IV) are prepared either by a two-fold condensation reaction of aminoazo dyestuffs of the formula (X)

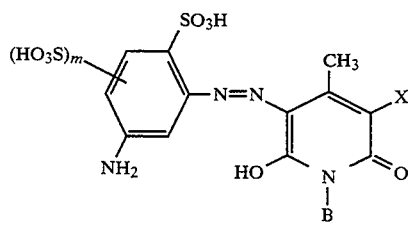

(X)

with trifluoro-s-triazine and an amino compound (VIII) as described above, or by diazotisation of the compounds of the formula (XI)

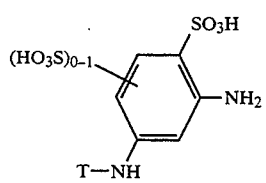

(XI)

and coupling of the diazonium compounds to pyridones of the formula (XII) or (XIII), as is described, for example, in DE-A 2 162 612.

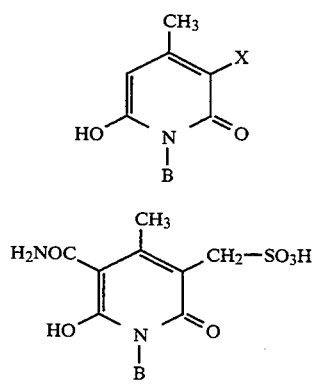

(XII)

(XIII)

Compounds (IX) are accessible, for example, by a two-fold condensation reaction of 2,4-diaminobenzenesulphonic acid or 2,4-diamino-1,5-benzenedisulphonic acid with tri-fluoro-s-triazine and an amino compound (VIII), or by a single condensation reaction of the aminobenzenesulphonic acids with the difluorotriazine compound (IX).

Suitable amines of the formula (VIII) are, for example:

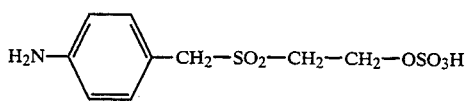

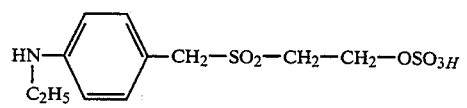

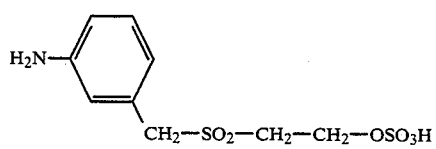

-continued

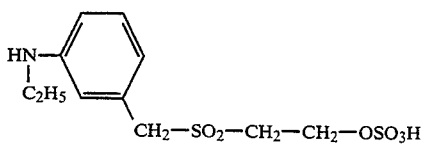

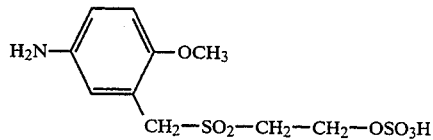

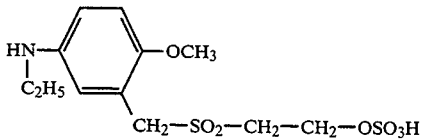

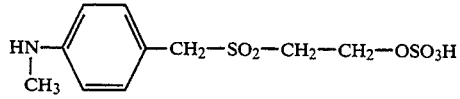

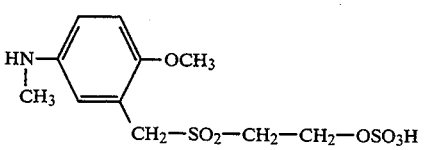

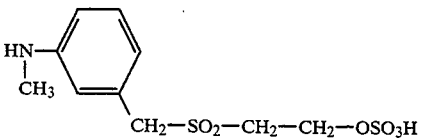

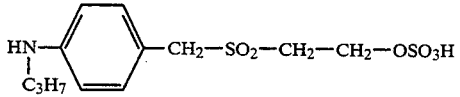

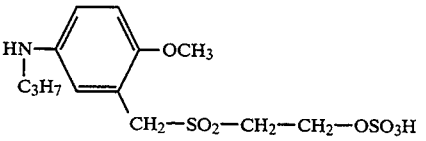

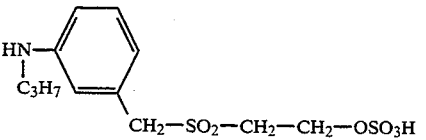

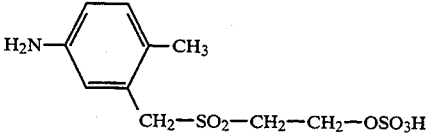

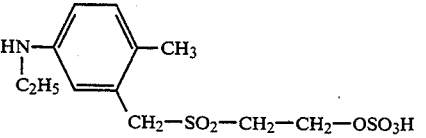

-continued

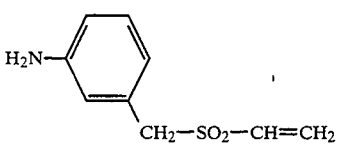

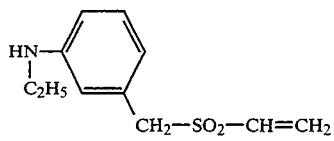

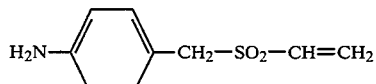

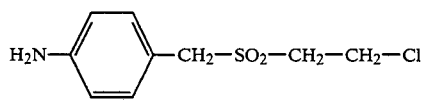

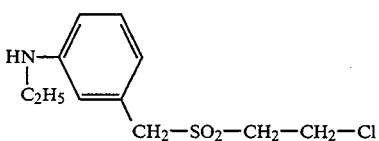

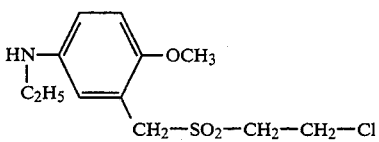

The dyestuffs according to the invention are outstandingly suitable for dyeing and printing naturally occurring and synthetic materials containing OH groups and/or amide groups, in particular those of cellulose and polyamides. They are particularly suitable for dyeing cellulose materials by the exhaustion and pad batch process and for printing cellulose materials such as cotton or viscose staple.

The dyestuffs can be used as a mixture with other dyestuffs for trichromatic dyeing.

Dyeings having good general fastnesses, in particular wetfastnesses, are obtained with a good build-up capacity and high fixing yields.

EXAMPLE 1

70.0 g of the monoazo colour base having the structure

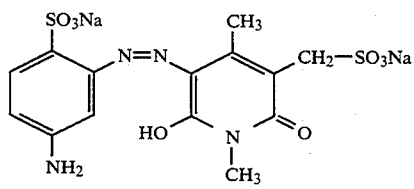

are stirred in 300 ml of water, the mixture is cooled to 0° C. by addition of ice, and 22 g of cyanuric fluoride are added. The pH is kept constant at between 4.5 and 5.5 by metering in a 20% strength sodium carbonate solution. The condensation reaction has ended within 10 minutes. A neutral solution of 43 g of 4-[(2-sulphatoethylsulphonyl)methyl]aniline in 200 ml of water is now metered into this solution at 0° C., the pH being kept at between 6.0 and 6.5 during this operation by addition of sodium carbonate solution. The mixture is then warmed to 20° C. at pH 6.5 in the course of 2 hours. After isolation and drying, 135 g of a salt-containing yellow dyestuff powder which dyes cotton in a brilliant greenish-tinged yellow colour shade by the process practised for reactive dyestuffs are obtained ($\lambda_{max}$=421 nm ($H_2O$ )). The dyestuff has the structure

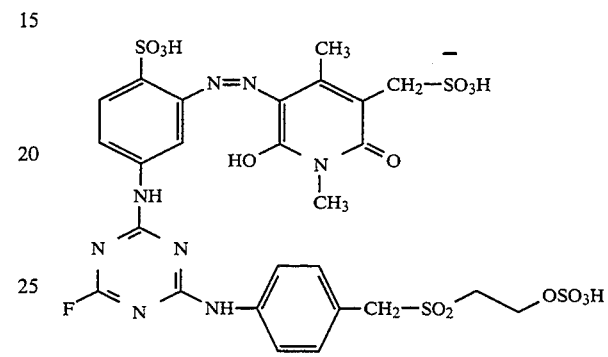

EXAMPLE 2

27.3 g of 2,4-diaminobenzenesulphonic acid are suspended in 150 ml of water and dissolved at pH 6.5 using dilute sodium hydroxide solution. 10 g of sodium fluoride are added as a buffer substance and the mixture is cooled to 0° C. with ice. 22 g of cyanuric fluoride are added rapidly and the pH is then kept constant at 4.5-5.0 with 20% strength sodium carbonate solution. After a reaction time of 15 minutes at pH 4.5-5.0, a neutral solution of 43 g of 4-[(2-sulphatoethylsulphonyl)methyl]aniline in 200 ml of water is added at 0° C., and the pH is controlled at 6.0-6.5 with sodium carbonate solution. The mixture is warmed slowly to 20° C., during which the pH is still kept at 6.0-6.5. The second condensation reaction has ended after about 2 hours.

200 g of ice are added to the acylation mixture and the mixture is brought to pH 2.2 at 0°-5° C. with dilute hydrochloric acid. 35 ml of a sodium nitrite solution (300 g/l) are now added dropwise in the course of 15 minutes at a reaction temperature below 5° C. The pH should be 2.2-2.5. The diazotisation has ended after 30 minutes. The excess nitrite is removed with amidosulphonic acid solution.

41.2 g of 1,4-dimethyl-3-aminocarbonyl-5-sulphomethyl-6-hydroxy-2-pyridone sodium salt are dissolved in 250 ml of water at pH 7, and this solution is metered into the above diazonium salt solution. The pH is brought to 6.5-7.0 by dropwise addition of sodium carbonate solution, and is kept constant at this value. After 30 minutes, a yellow solution results. The dyestuff proves to be identical to the dyestuff described in Example 1.

If the pyridone coupling component or the aminobenzylsulphonyl compound in Example 1 or 2 is varied, further useful greenish-tinged yellow dyestuffs such as are shown, for example, in Table 1 are obtained.

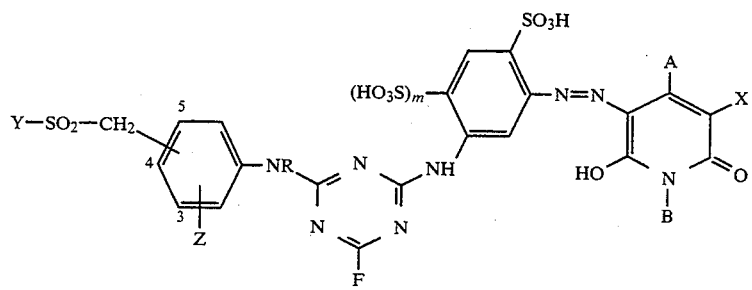

The tabular examples are characterised by the following $\lambda_{max}$ values ( $H_2O$ ):

| Example | nm |
| --- | --- |
| 3 | 422 |
| 4 | 422 |
| 5 | 423 |
| 6 | 423 |
| 7 | 422 |
| 8 | 420 |

Dyestuff mixtures, for example a mixture of Example 1 and 3, are obtainable by employing in Example 1, instead of 4-[(2-sulphatoethylsulphonyl)methyl]aniline, a mixture of the two isomers, that is to say 3-and 4-[(sulphatoethylsulphonyl)methyl]aniline.

tion of 41.2 g of 1,4-dimethyl-3-aminocarbonyl-5-sulphomethyl6-hydroxy-2-pyridone (Na salt) in 250 ml of water. During this operation, the pH is kept constant at between 6.5 and 7.5. The coupling reaction has ended after 30 minutes.

The mixture is then cooled to 0° C. with ice and a condensation reaction is carried out, as described in Example 1, with 22 g of cyanuric fluoride and subsequently with 43 g of 3-[(2-sulphatoethylsulphonyl)methyl]aniline. After salting out with potassium chloride, the dyestuff is isolated by filtration with suction and drying. The yellow dyestuff powder, which has the structure

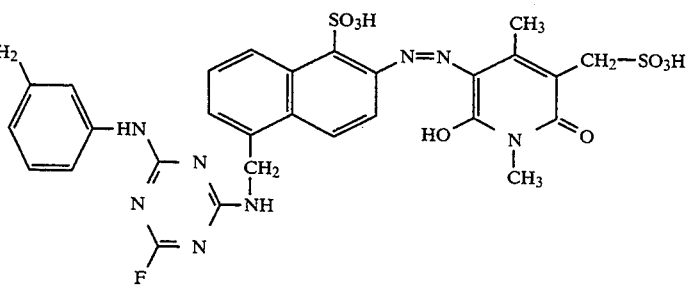

gives clear greenish-tinged yellow dyeings on cotton ($\lambda_{max}$=432 nm ($H_2O$)).

EXAMPLE 19

| Bsp. | A | B | X | m | Z | R | —CH$_2$—SO$_2$—Y |
| --- | --- | --- | --- | --- | --- | --- | --- |
| 3 | CH$_3$ | CH$_3$ | CH$_2$SO$_3$H | 0 | H | H | 3-CH$_2$—SO$_2$—C$_2$H$_4$—OSO$_3$H |
| 4 | CH$_3$ | C$_2$H$_5$ | " | 0 | H | H | 4-CH$_2$—SO$_2$—C$_2$H$_4$—OSO$_3$H |
| 5 | CH$_3$ | CH$_3$ | " | 0 | 4-CH$_3$ | H | 3-CH$_2$—SO$_2$—C$_2$H$_4$—OSO$_3$H |
| 6 | CH$_3$ | C$_2$H$_5$ | " | 0 | 4-OCH$_3$ | C$_2$H$_5$ | " |
| 7 | CH$_3$ | CH$_3$ | " | 0 | H | C$_2$H$_5$ | " |
| 8 | CH$_3$ | CH$_3$ | " | 0 | H | C$_2$H$_5$ | 4-CH$_2$—SO$_2$—C$_2$H$_4$—OSO$_3$H |
| 9 | CO$_2$H | H | H | 0 | H | H | " |
| 10 | CO$_2$H | H | CH$_2$SO$_3$H | 0 | H | H | 3-CH$_2$—SO$_2$—C$_2$H$_4$—OSO$_3$H |
| 11 | CH$_3$ | CH$_3$ | SO$_3$H | 0 | 4-CH$_3$ | H | " |
| 12 | CH$_3$ | CH$_3$ | SO$_3$H | 0 | H | C$_2$H$_5$ | 4-CH$_2$—SO$_2$—C$_2$H$_4$—OSO$_3$H |
| 13 | CH$_3$ | CH$_2$CH$_2$SO$_3$H | H | 0 | H | H | " |
| 14 | CH$_3$ | C$_2$H$_5$ | H | 1 | H | H | " |
| 15 | CH$_3$ | C$_2$H$_5$ | CONH$_2$ | 1 | H | C$_2$H$_5$ | " |
| 16 | CH$_3$ | CH$_2$CH$_2$SO$_3$H | " | 0 | H | H | 3-CH$_2$—SO$_2$—C$_2$H$_4$—OSO$_3$H |
| 17 | CO$_2$H | H | H | 1 | H | H | " |

EXAMPLE 18

36.5 g of 5-aminomethyl-2-amino-1-naphthalenesulphonic acid are stirred in 300 ml of water, 100 g of ice and 80 ml of 25% strength hydrochloric acid, and are diazotised with 35 ml of a 30% strength sodium nitrite solution. After removal of the excess nitrite, the resulting solution of the diazonium salt is metered into a solu- If, instead of 5-aminomethyl-2-amino-1-naphthalenesulphonic acid, equimolar amounts of 2-amino-4-(N-methyl-aminomethyl)-benzenesulphonic acid are employed as the diazo component in Example 18 and the reaction is carried out analogously to Example 18, a dyestuff having the structure is obtained.

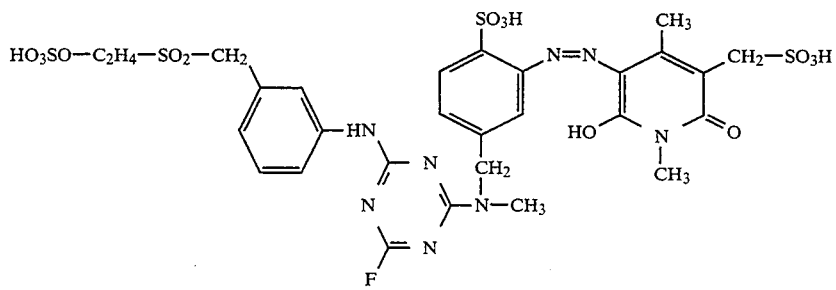

EXAMPLE 20

A diazonium salt mixture which has been prepared by diazotisation of 25.1 g of 3-aminobenzenesulphonic acid is metered into a neutral mixture of 84.2 g of the condensation product from 2,4-diaminobenzenesulphonic acid (Na salt), cyanuric fluoride and 4-[(2sulphatoethyl-sulphonyl)methyl]aniline (compare Example 2) in 250 ml of water. During this operation, the pH is kept at 6.0 to 6.5 by continuous addition of solid sodium bicarbonate. After a reaction time of 6 hours, the dyestuff having the structure

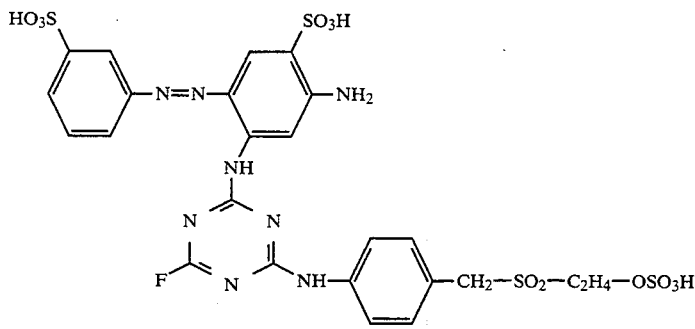

is isolated by salting out with sodium chloride and filtration with suction. The moist paste of the intermediate product is suspended in 200 ml of water and 200 g of ice, and the suspension is brought to pH 2.3 to 2.5 with hydrochloric acid at 0° C. Diazotisation is carried out slowly with 35 ml of a sodium nitrite solution (300 g/l), both the temperature, at 0° C., and the pH, at 2.3 to 2.5, being kept constant. The mixture is subsequently stirred for one hour, the excess nitrite is removed and the diazotisation mixture is added to a solution of 41.2 g of 1,4-dimethyl-3-aminocarbonyl-5-sulphomethyl-6-hydroxy-2-pyridone (Na salt) in 250 ml of water in the course of 30 minutes. The pH is kept at 6.5 to 7.5 by dropwise addition of sodium carbonate solution. After addition of the diazotisation mixture, the mixture is subsequently stirred for 15 minutes and the dyestuff is isolated by salting out (100 g of potassium chloride) and filtration with suction After drying at 60° C., 145 g of a salt-containing red dyestuff powder having the following structure:

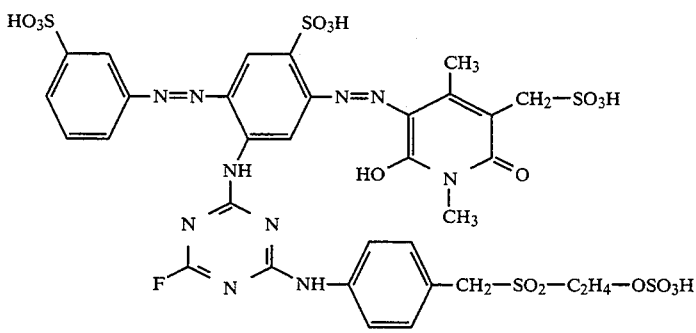

result.

The new diazopyridone dyestuff dyes cotton in brilliant orange colour shades ($\lambda_{max}$=460 nm ($H_2O$)).

EXAMPLE 21

28.6 g of 1-(2-aminoethyl)-3-aminocarbonyl-4-methyl-6-hydroxy-2-pyridone are dissolved in 250 ml of water under neutral conditions, and the solution is cooled to 0° C. 22 g of cyanuric fluoride are added at a constant pH of 8.0. The pH is controlled by addition of sodium carbonate solution. After a reaction time of 15 minutes, a neutral solution of 43 g of 3-[(2-sulphatoethylsulphonyl)methyl]aniline in 150 ml of water is added and condensation is carried out in the pH range between 6.5 and 7.5. The temperature rises to room temperature in the course of 2 hours, and the condensation has ended. The mixture is then heated to 50° C. at pH 7.0, and 55 ml of a neutral 37% strength hydroxymethanesulphonic acid solution are added. The mixture is heated at 50° C. at a constant pH of 7 for a further hour. This solution of the new intermediate product having the structure

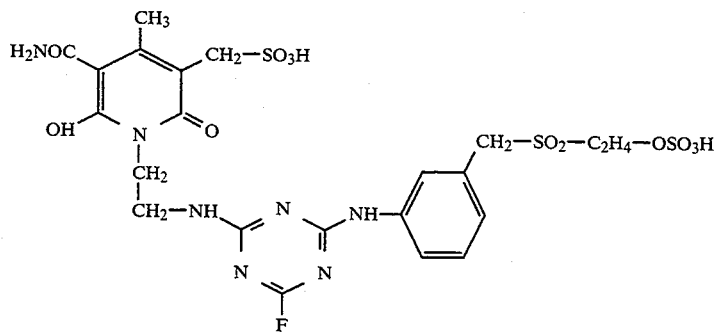

is cooled to room temperature and reacted with a diazonium salt mixture which has been prepared by diazotisation of 47.1 g of 2-amino-1,5-naphthalenedisulphonic acid Na salt. During the coupling reaction, the pH is kept constant at 6.5 to 7.5 with sodium carbonate solution. After the end of the reaction, the product is salted out with sodium chloride and the dyestuff which has precipitated is filtered off with suction. After drying, about 150 g of a yellow dyestuff powder having the structure

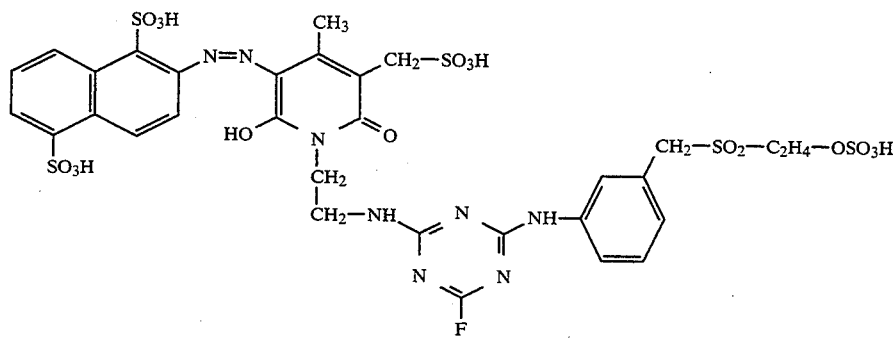

which dyes cotton in clear yellow shades having a high fastness level, are obtained ($\lambda_{max}$=430 nm ($H_2O$)).

Other useful reactive dyestuffs are accessible analogously to Example 21 by varying the diazo component and the pyridone substitution:

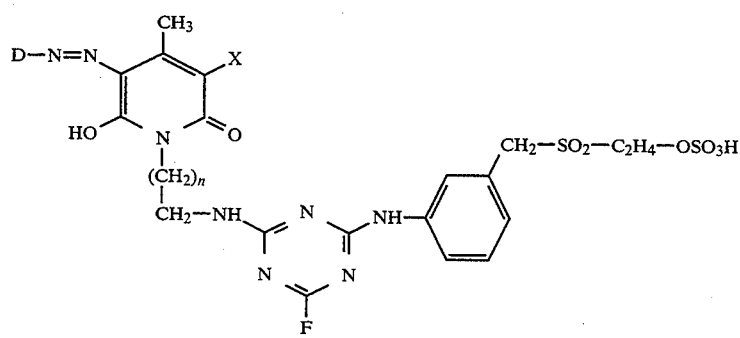

TABLE 2

| Example | D | X | n | Colour shade |
|---|---|---|---|---|
| 22 | ⌬-SO$_3$H (ortho) | CH$_2$SO$_3$H | 1 | greenish-tinged yellow (422 nm) |
| 23 | naphthyl-SO$_3$H | CH$_2$SO$_3$H | 1 | yellow |

TABLE 2-continued

| Example | D | X | n | Colour shade |
|---|---|---|---|---|
| 24 | 3-methylnaphthalene with SO₃H at 1, HO₃S at 6, SO₃H at 7 | CONH₂ | 1 | yellow |
| 25 | 3-methylnaphthalene with SO₃H at 1, HO₃S at 6, SO₃H at 7 | H | 1 | yellow |
| 26 | 2-methylnaphthalene with SO₃H at 1, SO₃H at 5 | CH₂SO₃H | 2 | yellow (430 nm) |
| 27 | 5-chloro-2-methylphenyl with SO₃H | CH₂SO₃H | 1 | greenish-tinged yellow |
| 28 | phenyl with SO₃H and HO₃S | H | 1 | greenish-tinged yellow |
| 29 | HO₃S—C₆H₄—N=N—C₆H₃(SO₃H)— | CH₂SO₃H | 1 | golden yellow (456 nm) |
| 30 | HO₃S—C₆H₄—N=N—C₆H₃(SO₃H)— | CH₂SO₃H | 2 | golden yellow (456 nm) |
| 31 | HO₃SO—CH₂CH₂—O₂S—C₆H₄— | CH₂SO₃H | 2 | greenish-tinged yellow |
| 32 | 2-methylnaphthalene with SO₃H at 1, HO₃SO—CH₂CH₂—O₂S— at 6 | CH₂SO₃H | 1 | greenish-tinged yellow |

We claim:

1. A reactive dyestuff which, as the free acid, corresponds to the formula

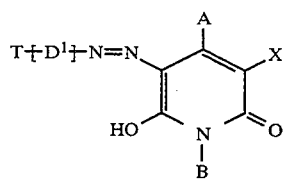

wherein
A is H or $C_1$-$C_4$-alkyl;
B is H, optionally substituted $C_1$-$C_6$ alkyl wherein the substituents are selected from the group consisting of OH, $SO_3H$, $OSO_3H$, $NH_2$, $CO_2H$, $NH(C_1$-$C_4$-alkyl) and $C_1$-$C_4$-alkoxy, $C_3$-$C_6$ cycloaliphatic radical, or optionally substituted phenyl wherein the substituents are selected from the group consisting of $SO_3H$, $CO_2H$, $CH_3$, $OCH_3$, $OC_2H_5$, $NH_2$ and $NH(C_1$-$C_4$-alkyl);
X is H, Cl, Br, $CH_3$, $CH_2SO_3H$, $CH(CH_3)$—$SO_3H$, $CONH_2$, or $COCH_3$;
$D^1$ is a radical of the formula

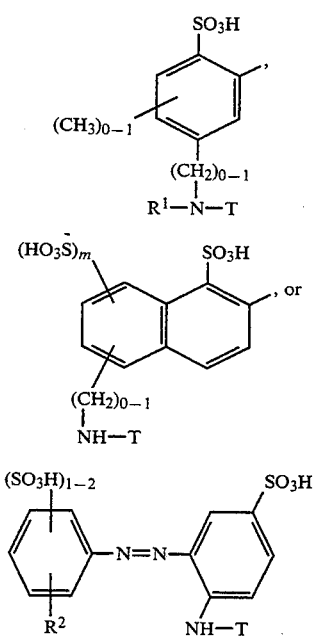

$R^2$ is H, $CH_3$, $OCH_3$, $OC_2H_5$, $CH_2SO_2W$, $SO_3W$;

where
W is $CH=CH_2$, $CH_2CH_2OSO_3H$ or $CH_2CH_2Cl$;
m is 0 or 1 and T is

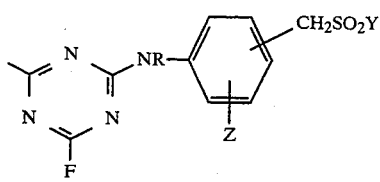

where
R is H, $CH_3$, $CH_2H_5$, $C_3H_7$, $CH_2CH_2OH$, $CH_2CH_2CO_2H$, $CH_2CO_2H$ or $CH_2CH_2CN$,
Z is H, $CH_3$, $C_2H_5$, $OCH_3$, $OC_2H_5$ or $OC_3H_7$ and
Y is $CH=CH_2$, $CH_2CH_2OSO_3H$ or $CH_2CH_2Cl$.

2. The reactive dyestuff according to claim 1 wherein X is Cl, Br, $CH_3$, $CH_2SO_3H$, $CH(CH_3)$—$SO_3H$, $CONH_2$, or $COCH_3$.

3. The reactive dyestuff according to claim 1, wherein
$D^1$ is

A is $CH_3$;
B is $CH_3$, $C_2H_5$, or $CH_2CH_2SO_3H$; and
X is H, $CONH_2$ or $CH_2SO_3H$.

4. The reactive dyestuff according to claim 1 which has the following structure

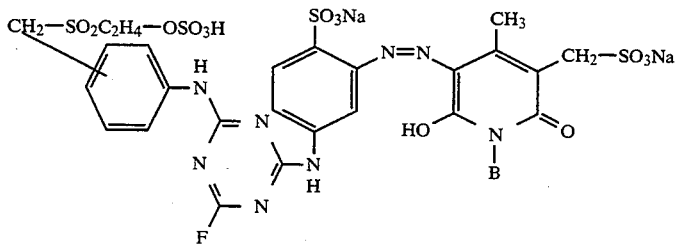

wherein
B is $CH_3$ or $C_2H_5$.

* * * * *

UNITED STATES PATENT AND TRADEMARK OFFICE
CERTIFICATE OF CORRECTION

PATENT NO. : 5,412,078
DATED      : May 2, 1995
INVENTOR(S): Eizenhofer, et al.

It is certified that error appears in the above-indentified patent and that said Letters Patent is hereby corrected as shown below:

Col. 17, line 12   After " $COCH_3$; " and below insert -- $R^1$ is H, $C_1$-$C_4$-alkyl or $CH_2Ch_2OH$ and --

Signed and Sealed this

Eighteenth Day of July, 1995

Attest:

BRUCE LEHMAN

*Attesting Officer*   *Commissioner of Patents and Trademarks*